R. A. THOM.
PIPE COUPLING.
APPLICATION FILED AUG. 27, 1919.

1,388,491.

Patented Aug. 23, 1921.
3 SHEETS—SHEET 1.

Inventor
Robert A. Thom
by Herbert W. Jenner.
Attorney.

R. A. THOM.
PIPE COUPLING.
APPLICATION FILED AUG. 27, 1919.
1,388,491.
Patented Aug. 23, 1921.
3 SHEETS—SHEET 2.
FIG. 8.
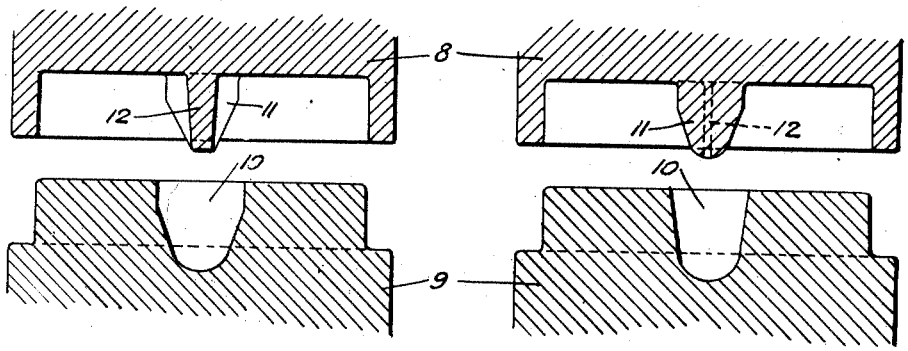
FIG. 11.
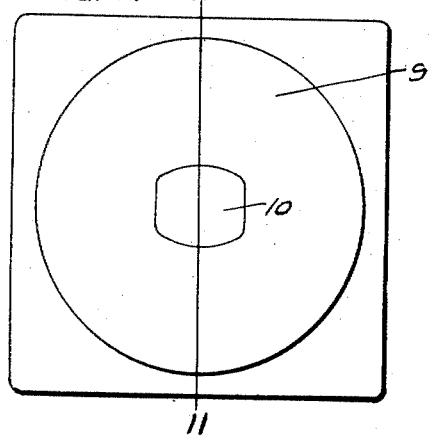
FIG. 9.
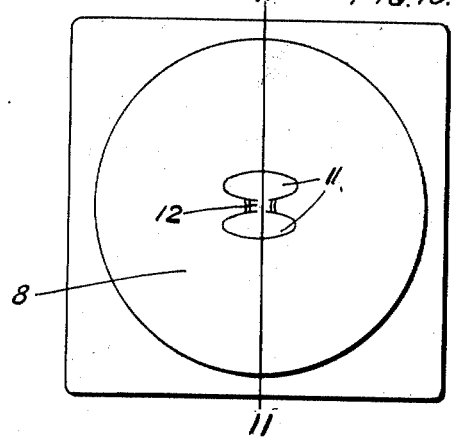
FIG. 10.
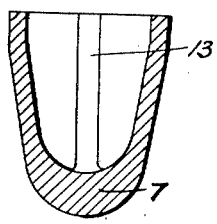
FIG. 12.
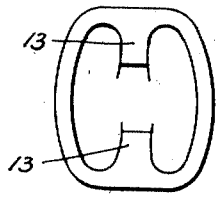
FIG. 13.
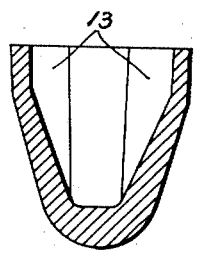
FIG. 14.
Inventor
Robert A. Thom
by Herbert W. Jenner
Attorney.

R. A. THOM.
PIPE COUPLING.
APPLICATION FILED AUG. 27, 1919.

1,388,491. Patented Aug. 23, 1921.
3 SHEETS—SHEET 3.

Inventor
Robert A. Thom
by Herbert W. Jenner.
Attorney.

UNITED STATES PATENT OFFICE.

ROBERT ABSALOM THOM, OF MANCHESTER, ENGLAND, ASSIGNOR TO THE SUPER-HEATER CORPORATION LIMITED, OF LONDON, ENGLAND.

PIPE-COUPLING.

1,388,491.            Specification of Letters Patent.      Patented Aug. 23, 1921.

Application filed August 27, 1919. Serial No. 320,207.

*To all whom it may concern:*

Be it known that I, ROBERT ABSALOM THOM, a subject of the King of Great Britain and Ireland, residing at Manchester, England, (whose post-office address is 11 Leven Terrace, Fairfield, Manchester, in the county of Lancaster, England,) have invented certain new and useful Improvements in Pipe-Couplings; and I do hereby declare the following to be a full, clear, and exact description of the invention, such as will enable others skilled in the art to which it appertains to make and use the same.

This invention has for its object improvements in or relating to steam superheating and other pipes, particularly to the return ends or connectors of such pipes.

The invention consists principally of an improved return end or connector for superheater and other pipes subjected to very high temperatures, and to a method of making such a return end.

A return end according to this invention is made from a solid piece of mild steel or like suitable metal which, after being suitably heated, is operated upon by suitable dies so as to form in the said solid piece two holes, preferably taper holes, terminating at a suitable depth in the said piece; after this operation has been performed the piece is reheated and operated upon by suitable dies so as to displace the metal between the aforesaid holes thus producing a hollow forging with the metal at the closed end, to be situated nearest the source of heat, thickened or left thicker to a suitable extent than that of the remaining portion of the forging, the said hollow forging being so formed that two diametrically opposite webs, fins or projections are left within the forging and separated from each other by a suitable space. The hollow forging with internal webs or projections is now operated upon by a suitable milling cutter or other suitable tool so as to cut away the inner portions of the above mentioned webs or projections from the inner or closed end of the forging to a suitable distance toward the opposite or open end thus reducing the depth or length of the webs to, for instance, half their original length, and thus providing the through passage for steam to flow from one pipe through the end to the other pipe; after this cutting operation the hollow forging is subjected to a further forging or pressing operation, by means of suitable dies, whereby the side walls of the forging, on which the aforesaid webs are formed, are pressed toward each other until the opposite faces or edges of the webs meet, the forging by this operation being flattened, and two holes are thus formed in the forging (suitable mandrels or cylindrical bars having been inserted in the forging) and separated at their outer ends by the abutting web parts, these holes being circular or approximately circular and preferably of a slightly smaller size than the ends of the two superheater pipes to be united by the return bend. The joint where the faces or edges of the aforesaid webs meet is then welded by the oxy-acetylene or other suitable welding process, and the aforesaid holes are further operated upon by a suitable tool, for instance a drill or reamer, so as to make them truly circular or adapted to nicely receive the ends of the two pipes to be united when the forging has been heated for shrinking purposes. The ends of the pipes having been inserted in the holes in the aforesaid forging (which has of course been suitably heated) the latter is then shrunk upon the pipe ends and preferably also welded thereto. The pipe ends may be secured in or to the return end in any other suitable manner, for instance instead of the pipe ends entering the holes in the return ends these holes might be of equal diameter to the internal diameter of the pipes to be joined to the return end which might be butt-welded to the ends of the pipes. Preferably however the pipes would enter the holes in the open end of the return end as above described.

The return end in its several stages of manufacture, and suitable dies for producing the return end, according to this invention are illustrated by the accompanying drawings, in which:—

Fig. 8 is a central vertical section through the dies for the next or finishing step in the drop stamping part of the process of manufacturing according to this invention.

Fig. 9 is a plan of the bottom die shown in Fig. 8.

Fig. 10 is an inverted plan of the top die shown in Fig. 8.

Fig. 11 is a vertical cross section of the dies shown in Figs. 8, 9 and 10, the section being taken on the line 11—11, Figs. 9 and 10.

Figs. 12, 13 and 14 are respectively sectional elevation, plan and vertical cross section of the drop stamping or forging as it appears after being operated on by the dies shown in Figs. 8 to 11, inclusive, but drawn to a larger scale than are the dies shown in such figures.

Figure 15:
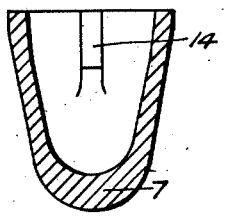
Figure 16:
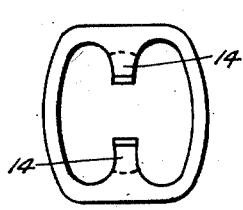
Figure 17:
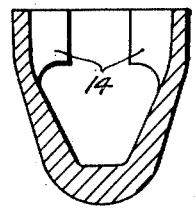

Figs. 15, 16 and 17 are respectively sectional elevation, plan and vertical cross section of the stamping or forging shown in Figs. 12, 13 and 14, after a machining or cutting operation has been performed as will be hereinafter described.

Figure 18:
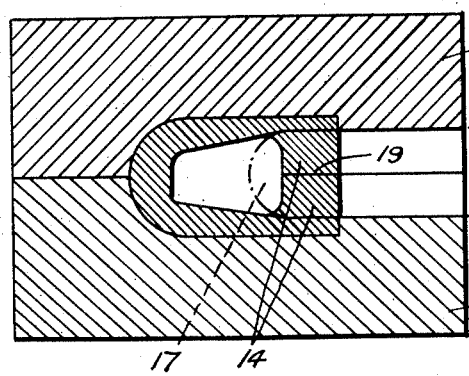
Figure 19:
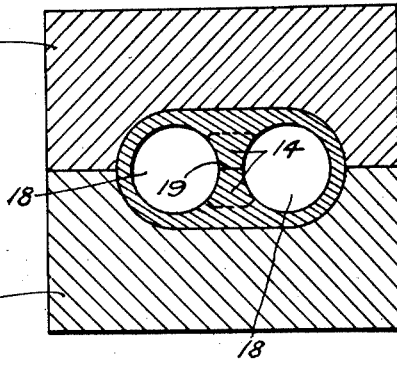

Figs. 18 and 19 are respectively sectional elevation and cross section of the dies employed for closing the stamping or forging to its final shape, the forging being shown in section in place in the dies.

Figure 20:
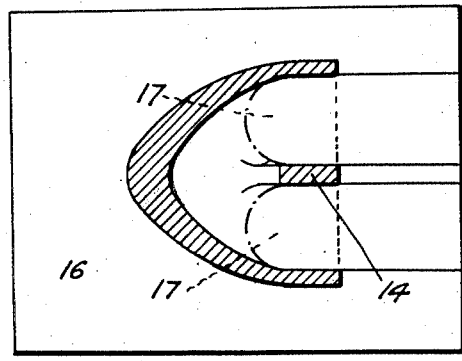
Figure 21:
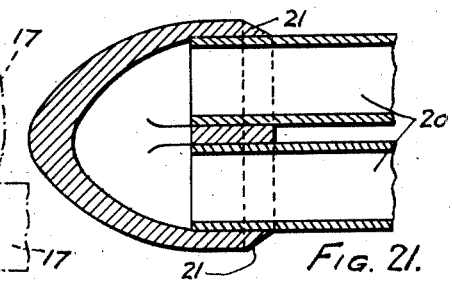
Figure 22:
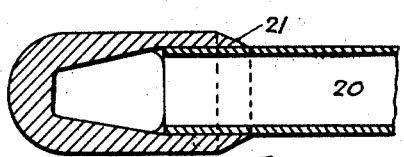
Figure 23:
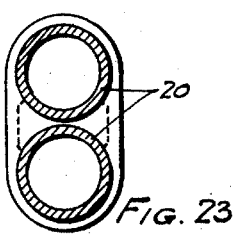

Fig. 20 is a plan of the bottom die Fig. 18, this figure also showing the stamping, in section, in place in the die, and Figs. 21, 22 and 23 are respectively sectional plan, sectional elevation and cross section of a finished return end for a superheater pipe, according to this invention, secured to the lengths of superheater pipe.

Like reference numerals will be used to indicate like parts in the several figures of the drawings.

Figure 1:
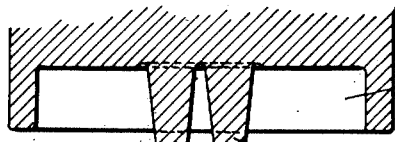
Figure 1 is a central vertical section through the roughing dies.
Figure 4:
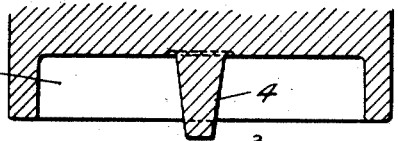
Fig. 4 is a vertical cross section of the dies shown in the preceding figures, taken on the line 4—4, Figs. 2 and 3.
Figure 2:
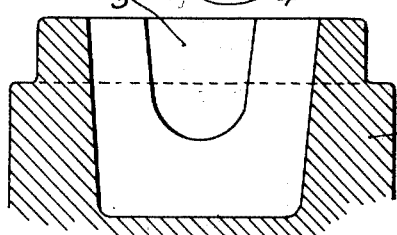
Fig. 2 is a plan of the bottom roughing die.
Figure 2:
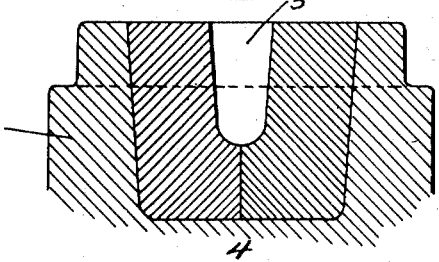
Figure 2:
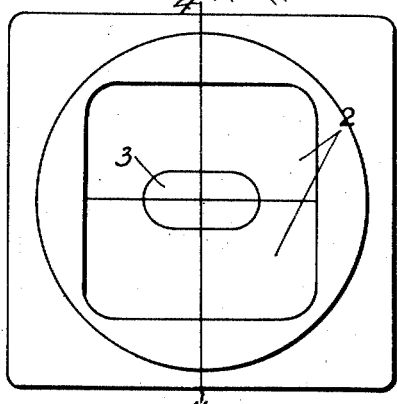
Figure 3:
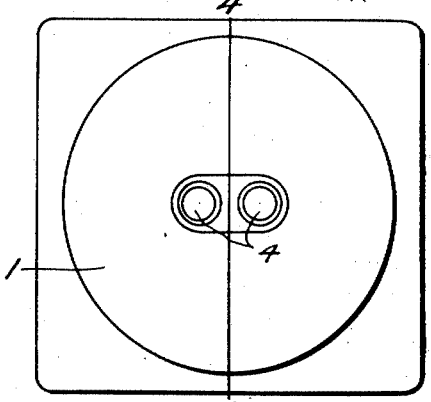
Fig. 3 is an inverted plan of the top roughing die.
Figure 5:
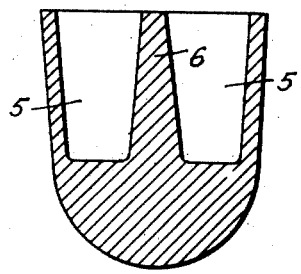
Figs. 5, 6 and 7 are respectively sectional elevation, plan and vertical cross section of the rough drop stamping or forging as produced by the dies shown in Figs. 1 to 4 inclusive, but drawn to a larger scale than are the dies in such figures.
Figure 6:
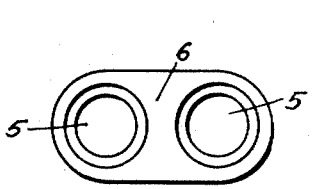
Figure 7:
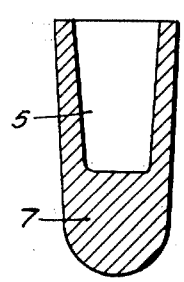

Referring to the drawings, 1 and 2 Figs. 1 to 4 are the top and bottom roughing dies, respectively, the bottom die 2 being preferably formed in halves and mounted in a die block or holder as clearly shown in Fig. 4. The bottom die 2 has a suitable recess 3 to receive the block or billet to be operated on, and the top die is provided with two conical or tapering projections 4, 4 adapted to be forced into the said block or billet. The block or billet of mild steel or like suitable metal, having been first heated to the desired temperature in a suitable forge or furnace, is placed in position in the recess 3 in the bottom die 2 and the upper die forced downwardly into said block or billet. The stamping or forging formed by this operation, shown in Figs. 5, 6 and 7, thus has two tapering holes or recesses 5, 5 separated by a web 6, and a relatively substantial solid bottom 7.

Referring now to Figs. 8 to 11, 8 and 9 are respectively top and bottom dies, the bottom die 9 having a recess 10 of the desired shape and the top die 8 being provided with a suitably shaped projection the form of which is clearly seen in Figs. 8, 9 and 11. This projection comprises two parts 11, 11 substantially elliptical in cross section joined by a relatively narrow web or connecting part 12, the parts 11 decreasing or tapering for a portion of their length toward their lower end. The stamping shown in Figs. 5, 6 and 7, produced by the dies shown in Figs. 1 to 4, is placed in position in the recess 10 of die 9 and the top die forced downwardly so that projection 11—12—11 enters said stamping. The stamping produced by these dies is illustrated by Figs. 12, 13 and 14, in which it will be seen that the connecting web or part 6, Figs. 5 and 6 has been divided forming two diametrically opposite inwardly projecting webs or fins 13, 13 and that the metal at the bottom or solid end 7 of the stamping has been displaced or reshaped the general shape of the stamping having been also altered as will be seen.

The hollow forging or stamping shown in Figs. 12, 13 and 14, is next operated on by a suitable milling cutter or other suitable tool so as to cut away the webs or fins 13 for the desired distance from the end 7 of the stamping or forging toward the upper or open end of same, for instance for about half the length of such webs, leaving only relatively short web or fin portions marked 14 in Figs. 15, 16 and 17, the forging now appearing as shown in said figures, this cutting away providing, in the completed return end, the passage or throughway for the steam.

The forging is now subjected to a further forging or stamping operation in the dies shown in Figs. 18, 19 and 20, in which Figs. 15 and 16 are the top and bottom dies respectively. As will be seen the dies 15 and 16 are identical in shape. The forging shown in Figs. 15, 16 and 17 is placed between the dies and the latter pressed toward each other, so that the web parts 14 of the forging approach each other. Before the dies are finally closed together suitable mandrels, such as 17, 17 Figs. 18 and 20, are inserted in the forging to assist in correctly shaping the same, and the forging operation then completed. Two circular or approximately circular holes 18, 18, Fig. 19, are thus formed in the forging, which holes are preferably slightly smaller in diameter than the external diameter of the ends of superheater pipes to be coupled together by the return bend.

The forging operations above described having been completed, the joint, indicated by the line 19, Figs. 18 and 19, where the web portions 14 meet or abut is then welded by any suitable welding process. To complete the return end ready for fitting to the lengths of superheater pipe, the two holes 18 are operated upon by a suitable drill or reamer so as to make them truly circular and adapted to nicely fit the ends of said lengths of pipe when the forging has been heated for shrinking purposes.

To unite the two lengths of pipe by the return end made as above described, said end is suitably heated and the ends of the pipes 20, Figs. 21, 22 and 23, inserted in the holes 18 in the forging and the latter shrunk on to such pipe ends. The pipes are also preferably welded to the return end in any convenient manner, for instance by depositing metal around them as shown at 21, Figs. 21 and 22. The pipe ends may, as above mentioned, be secured in or to the return end in any other suitable manner.

It will be understood that during the forging operations the metal would be suitably reheated if and when required.

Variations might be made in the method of making the return ends or connectors as above set forth without departing from the main features of the invention.

What I claim as my invention and desire to secure by Letters Patent is:—

1. A method of manufacturing return ends for the elements or pipes of steam superheaters or the like, in which a solid piece or billet of metal is formed into a hollow forging having integral inwardly projecting solid webs or fins, the inner portions of which webs or fins are subsequently cut away to provide the passage way through the end, the forging being next operated upon to bring the remaining portions of said webs or fins together and produce circular orifices on either side of the web portions, the said web portions being then welded together where they meet, and suitable drilling or reaming operations being then performed to render the holes at the end of forging to which the pipes are connected truly circular, the metal being suitably heated as required for the forging operations.

2. A method of manufacturing return end portions or couplings for pipes, which consists in first forming two holes side by side in a suitable piece of metal, then separating the metal between the holes to form two opposed fins, then removing the inner end portions of the fins, and then pressing together and welding the outer end portions of the fins and pressing the orifices thus formed into suitable shape to receive the end portions of the pipes.

3. A return end portion or coupling for pipes, comprising a piece of wrought metal having an internal chamber and two orifices communicating with the said chamber, said orifices being arranged side by side and adapted to receive the end portions of two pipes, the metal between the two orifices being formed of the outer end portions of two opposed fins which have been formed separate from each other and then pressed together and welded and the inner end portions of which have been removed to complete the internal chamber and connect the said orifices.

In testimony whereof I affix my signature, in presence of two witnesses.

ROBERT ABSALOM THOM.

Witnesses:
J. MOONEN,
W. H. SIMPSON.